United States Patent Office 3,524,749
Patented Aug. 18, 1970

3,524,749
CHLORINATED SOLVENT COMPOSITIONS CONTAINING PHOSPHORIC ACID FOR STABILIZATION AND FOR PHOSPHATIZING OF METALS
Arthur H. Parker, Franklin, Mich., and John P. Sherick, Dallas, Tex., assignors to E. I. du Pont de Nemours and Company, Wilmington, Del., a corporation of Delaware
No Drawing. Continuation of application Ser. No. 627,315, Mar. 31, 1967, which is a division of application Ser. No. 90,949, Feb. 23, 1961, which is a continuation-in-part of application Ser. No. 795,588, Feb. 26, 1959, which in turn is a continuation-in-part of application Ser. No. 775,395, Nov. 21, 1958. This application Nov. 26, 1968, Ser. No. 779,272
The portion of the term of the patent subsequent to Oct. 28, 1986, has been disclaimed
Int. Cl. C23f 7/08
U.S. Cl. 106—14                    4 Claims

ABSTRACT OF THE DISCLOSURE

Compositions are disclosed containing at least 85% by weight of a chlorinated hydrocarbon solvent such as trichlorethylene or perchlorethylene, plus between 5 p.p.m. and 5% of phosphoric acid, plus from 2–10% of a $C_{3-8}$ alcohol (such as amyl alcohol) as a solubilizer. The lower acid concentrations serve a stabilizing function; the higher concentrations provide compositions effective for the anhydrous phosphatizing of metals such as iron, steel, zinc and aluminum. The compositions are especially effective and safe when used for phosphatizing at their reflux temperatures.

CROSS-REFERENCES TO RELATED APPLICATIONS

This application is a continuation of our copending application Ser. No. 627,315, filed Mar. 31, 1967 now Pat. No. 3,475,228; which is a division of application Ser. No. 90,949, filed Feb. 23, 1961, now abandoned, which is a continuation-in-part of application Ser. No. 795,588, filed Feb. 26, 1959, now abandoned; which is a continuation-in-part of application Ser. No. 775,395, filed Nov. 21, 1958, now abandoned.

BACKGROUND OF THE INVENTION

This invention relates to non-aqueous phosphoric acid-containing trichlorethylene and perchlorethylene compositions. Trichlorethylene and perchlorethylene containing small amounts of phosphoric acid have been found very useful as phosphatizing compositions for use in forming phosphate coatings on metal surfaces. Moreover, under certain circumstances, phosphoric acid in very small amounts has, surprisingly, been found to stabilize trichlorethylene and perchlorethylene against chemical deterioration, as will appear hereinafter.

Phosphate coatings are widely employed for the purpose of reducing corrosion and improving the paint adhesion to metal surfaces. Current commercial practice is to phosphatize metallic surfaces with an aqueous solution that contains phosphatizing agents such as phosphoric acid and phosphate salts. The conventional aqueous process of phosphatizing requires a multitude of steps such as hot and cold water rinses before and after the metal being phosphatized is contacted with aqueous solutions during processing in addition to being rinsed with a solution of a chromic sealer. The corrosive influence of water is a serious disadvantage. Other disadvantages are apparent, such as the excessive time consumed by the lengthy sequence of essential steps, more costly and space-consuming equipment required and the necessity of carefully drying the metal surfaces after the workpieces have been processed.

Prior to this invention, no fully satisfactory non-aqueous process for the phosphatizing of metals was known to the art. The patent to Verner, No. 2,515,934, is directed to a non-aqueous phosphatizing composition comprising a volatile organic solvent such as acetone or an alcohol and containing less than 56% carbon tetrachloride as a flash inhibitor. The compositions of this patent are unsatisfactory since they have a flash point of kerosene and are, therefore, dangerous to use, especially at an elevated temperature.

The patent to Copelin, No. 2,789,070, is directed to the use of (tri)trichlorethylene or (per) perchlorethylene containing phosphoric acid and, since phosphoric acid is insoluble in tri or per, a small amount of an acid alkyl phosphate as an agent to solubilize the phosphoric acid in the tri or per. The process of the Copelin patent functions satisfactorily for a limited period of time but soon causes objectionable inactivation of the phosphatizing composition.

It is an object of the present invention to provide a stable, substantially nonaqueous and nonflammable solution that effectively phosphatizes a metal surface.

It is another object of the present invention to provide a commercially practicable nonaqueous phosphatizing solution that is stable under phosphatizing conditions for an extended period of time.

It is a still further object of the present invention to provide a method for phosphatizing a metal surface with a novel and substantially nonaqueous phosphatizing solution which may be integrated with conventional non-aqueous degreasing and/or painting operations.

It is yet another object of this invention to stabilize tri or per degreasing or painting baths operated in combination with a phosphatizing bath in a common vapor zone against deterioration.

SUMMARY OF THE INVENTION

The above-mentioned and yet other objects are accomplished using trichlorethylene or perchlorethylene, in combination with either a stabilizing amount or a phosphatizing amount of orthophosphoric acid and such an amount of lower aliphatic alcohol as will solubilize the amount of phosphoric acid in the said chlorohydrocarbon. Trichlorethylene is the preferred solvent. However, per as well as tri is nonflammable and compatible with the solubilizers of the present invention and phosphoric acid.

DESCRIPTION OF THE PREFERRED EMBODIMENTS

Phosphate coatings will be formed over a wide range of temperatures when metal surfaces are sprayed or dipped in the novel halogenated hydrocarbon phosphatizing solutions disclosed herein. The phosphatizing temperature is preferably within the range of about 60–120° C.

Conveniently, the phosphatizing temperature may be maintained at the refluxing temperature of the preferred solvents, trichlorethylene and perchlorethylene, having boiling points of about 87° C. and 120° C., respectively. Thus, the preferred phosphatizing temperatures proximate the boiling point of the principal preferred components of the bath, trichlorethylene or perchlorethylene, so that a vapor zone can be maintained over the phosphatizing solution.

Commercial orthophosphoric acid (85%) is not sufficiently soluble in the tri or per to be operative. For an effective phosphatizing amount of phosphoric acid, at least 0.05% by weight of the acid should be present in solution in the tri or per to develop a phosphate coating and preferably between 0.3–1% of the acid should be solubilized to be effective even at temperatures about 80° C. and above, if metal surfaces are to be rapidly processed. Up to about 5% phosphoric acid may be used as desired; higher amounts may result in the deposition of free phosphoric acid on the surface of the metal which should be removed before the surface is painted.

Meta-phosphoric and phosphorous acids are usually converted to orthophosphoric acid when subjected to heat and moisture. These acids are suitable in the presently described process in the amounts disclosed above. Commercial (85%) orthophosphoric acid contains a small amount of water, but the solutions of the present invention are homogeneous. These homogeneous single-phase solutions containing small amounts of water are substantially nonaqueous in nature and are so referred to herein.

The solubilizing agents of the present invention may be present in an amount between 2% and 10% by weight of the tri or per, and are the lower aliphatic alcohols having 3–8 carbon atoms, such as n-propanol, isopropanol, n-butanol, isobutanol, sec-butanol, n-amyl alcohol, pentanol-2, isoamyl alcohol, n-heaxnol, n-octanol and the like. Cyclic compounds such as cyclohexanol and benzyl alcohol will also solubilize phosphoric acid within these concentrations but are not as satisfactory as the aliphatic alcohols.

Those alcohols having less than 3 carbon atoms will solubilize phosphoric acid but are unsuitable under preferred phosphatizing conditions, since they render phosphatizing solutions volatile and flammable. Those aliphatic alcohols that have 3–8 carbon atoms have been found to be excellent solubilizers; they remain in the phosphatizing solution and vapor zone and do not require frequent replenishment. Furthermore, they are not decomposed and do not induce sludging even under highly acidic conditions.

The alcohol solubilizers also function to stabilize the bath to some extent. A refluxing phosphatizing bath of trichlorethylene, phosphoric acid and the alcohol solubilizers will retain a high order of activity over a long period of time even though no other stabilizer additives are present. For instance, a refluxing bath of 1500 ml. trichloroethylene, 143 ml. n-butanol and 8 ml. phosphoric acid stabilized with a combination of about 50 p.p.m. phenol, 150 p.p.m. pentaphen (para tertiary amyl phenol) and 3000 p.p.m. diisobutylene did not phosphatize steel panels more effectively than the same bath without any of the aforesaid added stabilizers when phosphatizing was carried out in glass containers. Chloride concentration and alkyl phosphate formation in baths containing stabilizing additives is generally lower, however. Even after 25 days' continuous reflux in glass, the bath containing the trichloroethylene, n-butanol and phosphoric acid but no stabilizer additives continued to form coatings approaching 200 mg./sq. ft. in 90 seconds.

If phosphatizing is carried out in metal units such as stainless steel, however, it has been found that metal corrosion can occur, especially under refluxing conditions at the areas near the vapor-air interface. Metal corrosion is probably accelerated by chloride formation, but in any event corrosion of this type can be mitigated by using an alcohol solubilizer that fosters conditions less corrosive to the metal. Alcohols that particularly mitigate metal corrosion are n-amyl alcohol and pentanol-2. These alcohols do not form an azeotrope with the chlorinated hydrocarbon solvent vapor and furthermore, the baths containing these alcohols retain very small amounts of water. The products of metal corrosion, including metal salts, tend to deactivate phosphatizing baths and reduce the amount of coating obtained for a given immersion time. These metal impurities can easily be removed, where necessary, with activated charcoal with or without filtration and as little as 0.01% activated charcoal will restore activity.

Another source of deactivation is the formation of alkyl phosphates; metal impurities are believed to accelerate and promote the reaction between the solubilizer and acid. However, use of pentanol-1 (n-amyl alcohol) or pentanol-2 solubilizers creates conditions less favorable to deactivation by the combined effects of metals contamination and alkyl phosphate formation than is experienced when alcohols containing 4 carbons are used. As alkyl phosphates are formed, ortho-phosphoric acid can be added to the bath to partially offset the deactivating effects of alkyl phosphates.

Additional stabilizers can be added to the bath provided that they can tolerate the highly acidic bath and do not react with phosphoric acid. Such well-known stabilizers as pentaphen, phenol and diisobutylene have been used and reduce chloride and alkyl phosphate formation in the bath to some extent. It is to be understood, however, that phosphatizing baths can be operated satisfactorily with or without such stabilizers.

Phosphatized surfaces should have an amount of coating equivalent to at least 100 mg./sq. ft., preferably 150 mg./sq. ft. to resist corrosion. A commercial bath should form effective coatings in less than 5 minutes' treatment, preferably within 2 minutes' treatment time. Furthermore, the bath should be sufficiently stable to impart satisfactory coatings over extended time periods with only periodic replenishment of phosphoric acid, alcohol solubilizer and chlorinated hydrocarbon solvent. The baths of the present invention are capable of operating under reflux conditions to yield excellent coatings in conventional degreasing apparatus.

A conventional degreasing apparatus that is designed to dip or spray metal articles can be used to carry out the process of the invention and the phosphatizing solution may be dipped or sprayed on the surface of the articles under a vapor zone defined by condensing coils as used in well-known vapor degreasers. Corrosion resistance of phosphatized panels as expected increases with longer spray or immersion treating periods up to about 3–5 minutes. The usual procedure is to phosphatize for the required time and then retain a treated article in the vapor zone for 5–15 seconds under commercial operation thereby to provide a suitable vapor rinse. After the articles are removed from the vapor zone the phosphatized surfaces are dry and can be further processed.

In order to operate in a most economical manner it is highly desirable, if not essential, that the tri or per phosphatizing bath be operated with closely adjacent degreasing and painting baths in a vapor zone common to all three baths. The metal articles are thus brought into a container for the three baths below the condensing coils and through the common vapor zone into a degreasing bath, then into a phosphatizing bath and finally into a painting bath. Between the baths the articles are momentarily brought into contact with the common vapor zone. From the painting bath the articles are raised through the vapor zone and are deposited, painted and dry into an area outside of the degreasing-phosphatizing-painting apparatus.

It has now been found that the alcohol of the phosphatizing bath vaporizes with the tri or per and will recondense with the tri and flow into all three baths. The alcohol that flows into the degreasing and painting baths was found to have a highly adverse deteriorating effect on the tri or per contained in these baths. It was furthermore found, in accordance with this invention, that such deterioration can be almost completely eliminated by adding to these baths as little as 5 parts per million of phosphoric acid. Larger amounts can, of course, be added, however, unless it be desired to cause a phosphatizing of the metal articles in the degreasing or painting baths, the phosphoric acid content of these baths should be limited to less than .05%.

When operating in a common vapor zone, therefore, all three baths will contain, by weight, at least 85% tri or per, between 2% and 10% of a lower aliphatic alcohol containing 3–8 carbon atoms and between 5 p.p.m. and 5% of phosphoric acid. These baths may contain one or more other stabilizing agents such as phenol, pentaphen, diisobutylene or the like, if desired.

The phosphatizing solutions of the present invention are especially suitable for iron and steel surfaces. These solution are also capable of producing metallic phosphate coatings on other metal surfaces, including zinc and aluminum. Phosphate coatings on aluminum, however, are water soluble and are principally useful to improve impact and mandrel resistance of subsequently applied paint films on surfaces that are unexposed to moisture.

These surfaces are contacted by the phosphatizing solutions for at least 15 seconds under preferred conditions. Baths maintained at the preferred temperature, about 60°–120° C., and containing 0.3–1.0% of the phosphoric acid will effectively phosphatize metal surfaces in 15 seconds to 5 minutes, although 1–3 minutes is the preferred phosphatizing time when the bath is operated at reflux temperatures. Some of the baths of the present invention are more active than others. Accordingly, steel parts will develop a light-gray coat of iron phosphate when treated in the highly active baths more rapidly than in the less active solutions.

The following examples are illustrative of the process and phosphatizing baths.

Example 1

A half-gallon of phosphatizing solution containing:

| | Ml. |
|---|---|
| Perchlorethylene | 2000 |
| n-Propanol | 300 |
| 85% orthophosphoric acid | 8 | and maintained at 120° C. will impart a light-gray coating on steel coupons. The coupons are immersed for periods of 1 and 2 minutes.

Example 2

Similar results to those of Example 1 can be observed when the coupons are immersed for 1 and 2 minutes at 87° C. in a solution containing:

| | Ml. |
|---|---|
| Trichlorethylene | 2000 |
| 2-heptanol | 350 |
| 85% orthophosphoric acid | 10 |

The paint adhesion properties of the phosphate coatings produced by our system have been evaluated by means of the following test among others. Steel nails are phosphatized and then painted with a commercial beige-colored alkyd resin enamel and baked at 290° F. for 20 minutes. The painted samples are then immersed in a paint stripping solution composed of 95% methylene chloride and 5% methanol until blistering occurs. The time which elapses from the instant of immersion until blistering is observed is used as a measure of paint adhesion.

Control samples not phosphatized blister 7 seconds after immersion. Samples phosphatized by a commercial aqueous process blistered after 20 seconds immersion. Excellent results have been obtained with samples phosphatized with the novel baths described herein as shown by the following examples:

Example 3

A half-gallon of phosphatizing solution was prepared by dissolving the following:

| | Ml. |
|---|---|
| Trichlorethylene | 2000 |
| n-Butyl alcohol | 250 |
| 85% orthophosphoric acid | 1.8 |

The solution was heated to reflux temperature (87° C.) and steel nails were immersed in it for periods of 30 and 60 seconds. The samples were subsequently painted as described in Example 2. In paint stripping tests, 28 seconds were required before blisters were observed on nails treated for 30 seconds and, on nails treated for 60 seconds, no blistering occurred during the first 70 seconds.

Example 4

A half-gallon of phosphatizing solution was prepared to contain the following:

| | Ml. |
|---|---|
| Trichlorethylene | 2000 |
| n-Butyl alcohol | 250 |
| 85% orthophosphoric acid | 14 |

Steel nails were treated in this solution maintained at optimum operating temperature (87° C.) for periods of 30 seconds and 60 seconds, respectively, then painted and tested as set forth in Example 2. Substantially no failure occurred even after several hours exposure.

Example 5

A half-gallon of phosphatizing solution containing:

| | Ml. |
|---|---|
| Trichlorethylene | 2000 |
| n-Butyl alcohol | 220 |
| 85% orthophosphoric acid | 9.0 | was heated to reflux temperature. Steel nails immersed in the solution for periods of 0.5 and 2.0 minutes, respectively, showed substantially no blistering after 24 hours' immersion in the methylene chloride-methanol stripping solution.

In the above tests, the amount of paint blistering observed on nails previously phosphatized according to the present invention was not considerable. Those nails phosphatized by different methods and subsequently painted were invariably severely blistered. The solution of Example 5 contains about 5.7% by weight alcohol and 0.5% phosphoric acid. An increase in the alcohol content as in Example 4 should be accompanied by an increase in acid for best results. However, all of the baths containing 2–10% alcohol and 0.1–5% (85%) phosphoric acid will effectively phosphatize metal surfaces.

The amount of phosphate coating produced by the present process ranges between 20 and 400 milligrams per sq. ft. and is approximately directly proportionate to the treatment time. Coating weights are determined by phosphatizing a steel coupon of known dimension, weighing, stripping in chromic acid and reweighing. The weight loss represents the phosphate coating per test coupon.

Accordingly, the bath of Example 5 gave the following results:

| Time, minutes: | Wt. of coating, mg./sq. ft. |
|---|---|
| 1 | 79 |
| 2 | 110 |
| 3 | 193 |
| 4 | 259 |
| 5 | 304 |

These coating are anhydrous and will increase in weight if exposed to steam or high humidity atmospheres. Paint adherence tests have clearly shown that articles phosphatized in accordance with the present invention are equivalent to or in some respects superior to those articles that have been coated by conventional aqueous phosphatizing processes.

Example 6

A half-gallon phosphatizing solution was prepared as in Example 5 and heated to 87° C. Steel panels (4″ x 8″) were phosphatized by immersing them in the solution for 2 minutes. The panels were then painted with a 2-coat system with each coat being baked for 45 minutes at 450° F. Similar panels treated in a conventional aqueous phosphatizing process and untreated panels were given identical paint treatments. All of the panels were subjected to impact tests (falling weight) and conical mandrel tests (bending) for paint adhesion comparisons. Panels treated in the trichlorethylene phosphatizing solution showed virtually no cracking or peeling of the paint. The untreated panels and aqueous phosphatized panels showed cracking and loss of paint.

Example 7

Example 6 was repeated using aluminum panels which were (1) untreated and (2) phosphatized in the trichlorethylene phosphatizing solution prior to painting. The untreated panels lost considerable amounts of paint upon subjecting to impact and conical mandrel tests. The phosphatized panels showed only a slight cracking of the paint and no paint loss.

As previously mentioned, the phosphatizing baths of the present invention can be continuously used for months at reflux temperature; the baths remain stable and sludge formation is negligible. In addition to the many advantages enumerated above, the baths are non-flammable.

The above examples relate to phosphatizing experiments carried out in glass containers. When phosphatizing is carried out in stainless steel containers, however, considerable deactivation can occur over a period of time unless metal corrosion is prevented or minimized. For instance, a bath of about 5% n-butanol, 0.5% phosphoric acid, balance trichlorethylene was made up and salts of the following metals were added to simulate actual contamination:

| | P.p.m. |
|---|---|
| Fe | 82 |
| Ni | 12 |
| Mg | 6 |
| Cr | 6 |
| Mn | 6 |
| Zn | 6 |
| Mo | 2 |
| Al | 2 |
| Na | 0.8 |
| Cu | 1 |
| Co | 0.8 |

The coating weight was initially 102 mg./sq. ft. under reflux conditions in 90 seconds. After the addition of 0.1% activated charcoal a coating weight of 215 mg./sq. ft. was obtained and filtering out the carbon resulted in increasing the coating weight to 271 mg./sq. ft. It was observed that if some of the contaminating metals form insoluble matter that precipitates out, little damage to activity occurs. For instance, iron impurities apparently do not appreciably affect the coating weight. It was further observed that the addition of minute amounts of water to the bath in the order of 200 p.p.m. (insufficient to produce an aqueous solution) increased the coating weight.

In order to show the marked superiority of n-amyl alcohol and pentanol-2 solubilizers in maintaining phosphatizing activity under corrosive conditions, phosphatizing baths were refluxed in 302 (17–19% Cr, 8–10% Ni) and 316 (16–18% Cr, 10–14% Ni, 1.75–2.75% Mo) stainless steel containers. Steel panels were phosphatized for 90 seconds in the baths and coating weights were determined after the elapsed periods of time indicated. Periodic additions of phosphoric acid were made to maintain the acid concentrations constant where necessary. The compositions contained no stabilizer additives other than the phosphoric acid.

EXAMPLE 8

| Bath composition | Type of stainless steel | Elapsed time | Coating wt., mg./sq. ft |
|---|---|---|---|
| 1,500 ml. Tri; 150 ml. isobutyl alcohol; 10 ml. H₃PO₄. | 302<br>302<br>302<br>302 | Initial (in glass)<br>1 day<br>2 days<br>3 days | 165<br>45<br>63<br>69 |
| 1,500 ml. Tri; 143 ml. n-butanol; 7 ml. H₃PO₄. | 302<br>302<br>302<br>302 | Initial (in glass)<br>1 day<br>2 days<br>3 days | 111<br>89<br>39<br>44 |
| 1,500 ml. Tri; 150 ml. isoamyl alcohol; 13 ml. H₃PO₄. | 302<br>302<br>302<br>302<br>302<br>302<br>302<br>302<br>302 | Initial (in glass)<br>1 day<br>2 days<br>3 days<br>4 days<br>5 days<br>6 days<br>7 days<br>8 days | 182<br>179<br>123<br>115<br>110<br>116<br>103<br>77<br>93 |
| 1,500 ml. Tri; 180 ml. sec-butyl alcohol; 13 ml. H₃PO₄. | 302<br>302<br>302<br>302<br>302<br>302 | Initial (in glass)<br>1 day (still in glass)<br>After 2 hours in stainless steel pot<br>2 days<br>3 days<br>4 days<br>5 days | ----<br>125<br>----<br>113<br>66<br>41<br>45 |
| 1,500 ml. Tri; 150 ml. n-hexyl alcohol; 9 ml. H₃PO₄. | 302<br>302<br>302<br>302<br>302<br>302<br>302<br>302 | Initial (in glass)<br>1 day<br>2 days<br>3 days<br>4 days<br>5 days<br>6 days<br>7 days | 195<br>124<br>154<br>122<br>120<br>122<br>144<br>110 |
| 1,500 ml. Tri; 150 ml. n-amyl alcohol; 9 ml. H₃PO₄. | 302<br>302<br>302<br>302<br>302<br>302<br>302<br>302 | Initial (in glass)<br>1 day<br>2 days<br>3 days<br>5 days<br>6 days<br>7 days<br>14 days | 185<br>228<br>189<br>----<br>219<br>190<br>186<br>174 |
| 1,300 ml. Tri; 180 ml. pentanol-2; 12 ml. H₃PO₄. | 302<br>302<br>302<br>302<br>302<br>302<br>302 | Initial (in glass)<br>1 day<br>2 days<br>3 days<br>5 days<br>6 days<br>7 days | 243<br>275<br>229<br>----<br>229<br>167<br>168 |
| 1,500 ml. Tri; 150 ml. n-amyl alcohol; 9 ml. H₃PO₄. | 316<br>316<br>316<br>316<br>316<br>316<br>316<br>316 | Initial (in glass)<br>1 day<br>2 days<br>3 days<br>4 days<br>5 days<br>6 days<br>7 days | 156<br>173<br>217<br>198<br>186<br>195<br>209<br>212 |
| 1,500 ml. Tri; 150 ml. isoamyl alcohol; 13 ml. H₃PO₄. | 316<br>316<br>316<br>316<br>316 | Initial (in glass)<br>1 day<br>3 days<br>4 days<br>5 days | 219<br>----<br>190<br>143<br>135 |

In order to determine the rate of corrosion on various stainless steels and the effect of stabilizer additives, stainless steel coupons were suspended in the vapor zone with the bottom edges contacting the refluxing phosphatizing solutions. It was found that stabilized trichlororethylene gave somewhat less corrosion than the same bath without stabilizer additives. Up to 200 p.p.m. phenol and pentaphen and up to 0.2–0.3% diisobutylene is suitable. It was further found that the nickel alloy referred to in the art as "hastelloy" C resists corrosion more than either 302, 304, 316 or 321 stainless steels. It was also determined that water-soluble chloride and alkyl phosphate concentrations increase with the rate of corrosion of stainless steels.

The following examples set forth the results obtained by placing alkyd resin-coated samples of cold-rolled auto body steel which have been phosphated in Tri solutions containing varying percentages of H₃PO₄ (100% basis) for stated periods under salt spray test. Such salt spray test is a conventional paint adherence test as set forth in ASTM Standard B 117–57 T. The alkyd resin is a commercially available baked enamel sold by E. I. du Pont de Nemours and Company, Wilmington, Del., as "Dulux"

752-66295. The enamel is applied to a thickness of about 1 mil and is baked on at a temperature of 350° F. for ½ hour.

| Example No. | Percent H₃PO₄ (100% basis) | Percent n-amyl alcohol | Description of coating |
|---|---|---|---|
| 9 | .01 | 4.8 | Imperceptible coating after 30 minutes immersion. |
| 10 | .05 | 4.8 | Light blue coating in 5 minutes. |
| 11 | 0.1 | 4.8 | Even gray coating in 2½ minutes salt spray under "Dulux" 752-66295 enamel=27 hours compared to 23 hours for untreated panel. |
| 12 | ¹.34 | 3.4 | Even gray coating in 2½ minutes; salt spray under "Dulux" 752-66295=120 hours. |
| 13 | 0.48 | 4.8 | Even gray coating in 90-150 seconds; salt spray under "Dulux" 752-66295=300-500 hours. |
| 14 | ¹1.5 | 4.9 | Heavy gray coating in 90 seconds; tends to get sticky 10-20 min. after phosphatizing; salt spray under "Dulux" 752-66295 about 500 hours. |
| 15 | ¹3.0 | 7 | Heavy gray coating in 90 seconds; tends to get sticky 10-20 min. after phosphatizing; salt spray under "Dulux" 752-66295 about 300 hours. |
| 16 | ¹7.5 | 10 | Heavy dark gray coatings in 90 sec. tends to get sticky; also tends to drag out n-amyl alcohol. (impact resistance unacceptable). |

¹ Solubility limit.

The following examples illustrate the marked stability to be obtained in trichlorethylene containing a lower alcohol having 3-8 carbon atoms by the addition of very small quantities of phosphoric acid or compounds which are able to release free phosphoric acid. The examples refer to the amount of 1 N HCl, in cc., in the sample and the amount of chlorides therein, in parts per million.

STANDARD STABILITY TEST.—EFFECT OF PHOSPHORIC ACID

| Ex. No. | Sample | 1 N HCl, cc. | Chlorides, p.p.m. |
|---|---|---|---|
| 17 | Tri B | 1.84 | 50 |
| 18 | Tri B plus H₃PO₄ (5 p.p.m.) | .43 | 3 |
| 19 | Tri B plus H₃PO₄ (10 p.p.m.) | .61 | 7 |
| 20 | Tri B plus H₃PO₄ (25 p.p.m.) | .19 | <1 |
| 21 | Tri A plus amyl | 2.4 | 40 |
| 22 | Tri A plus amyl plus H₃PO₄ (5 p.p.m.) | .09 | 1 |
| 23 | Tri A plus amyl plus H₃PO₄ (10 p.p.m.) | .08 | 0 |
| 24 | Tri A plus amyl plus H₃PO₄ (25 p.p.m.) | .06 | 0 |
| 25 | Tri A plus amyl plus H₃PO₄ (50 p.p.m.) | .07 | 0 |

EFFECT OF PHOSPHORIC ACID & DERIVATIVES

| Ex. No. | Sample | 1 N HCl, cc. Total | 1 N HCl, cc. Water layer | Chlorides, p.p.m. |
|---|---|---|---|---|
| 26 | Tri A plus amyl plus Na₃PO₄ (.0625 g.) | .75 | | 20-25 |
| 27 | Tri A plus amyl plus Na₃PO₄ (.125 g.) | 0 | | 0 |

The stability tests are conventional tests. The HCl analysis is based upon refluxing the trichlorethylene for four hours in a flask in the presence of iron powder, ultraviolet light, and bubbles of oxygen. The HCl that is formed is collected in a water trap. The amount of this HCl is determined by titrating both the water and the solvent itself. The chloride analysis is based upon an extraction of the water-soluble chlorides into a measured volume of distilled water, followed by precipitation with a standard silver nitrate solution in the presence of nitric acid and comparison of the resulting turbidity with that of samples having known chloride contents.

In the examples, Tri A refers to trichlorethylene containing 0.3 to 0.4% diisobutylene and 0.01 to 0.02% pentaphen, Tri B refers to trichlorethylene containing 2½% amyl alcohol and 0.3 to 0.4% diisobutylene.

Throughout the specification, parts and percentages are based on weight unless otherwise indicated.

Since it is obvious that many changes and modifications can be made in the above-described details without departing from the nature and spirit of the invention, it is to be understood that the invention is not to be limited to said details except as set forth in the appended claims.

We claim:

1. A stable nonflammable substantially non-aqueous metal coating composition consisting essentially of at least 85% of a chlorinated hydrocarbon taken from the group consisting of trichlorethylene and perchlorethylene, between 2% and 10% of a lower aliphatic alcohol having 3-8 carbon atoms and between 5 p.p.m. and about 1% of phosphoric acid.

2. A solution according to claim 1 which contains between 0.05% and about 1% of phosphoric acid.

3. A composition according to claim 1 which contains between about 0.1% and about 1% of phosphoric acid.

4. A composition according to claim 1 which contains between about 0.3% and about 1% of phosphoric acid.

References Cited

UNITED STATES PATENTS 3,361,598   2/1968   Vullo et al.

FOREIGN PATENTS 584,827   12/1959   Belgium.

JULIUS FROME, Primary Examiner

L. B. HAYES, Assistant Examiner

U.S. Cl. X.R.

148—6.15; 252—387, 388